US008842682B2

(12) United States Patent
Laulainen et al.

(10) Patent No.: US 8,842,682 B2
(45) Date of Patent: Sep. 23, 2014

(54) METHOD AND DEVICE FOR FORWARDING DATA TRANSPORT FRAMES

(75) Inventors: Mikko Laulainen, Helsinki (FI); Juha-Petteri Nieminen, Espoo (FI); Mika Silvola, Kempele (FI)

(73) Assignee: Tellabs Oy, Espoo (FI)

( * ) Notice: Subject to any disclaimer, the term of this patent is extended or adjusted under 35 U.S.C. 154(b) by 891 days.

(21) Appl. No.: 12/611,949

(22) Filed: Nov. 4, 2009

(65) Prior Publication Data
US 2010/0110990 A1 May 6, 2010

(30) Foreign Application Priority Data
Nov. 4, 2008 (FI) ..................................... 20086046

(51) Int. Cl.
*H04L 12/28* (2006.01)
*H04W 76/02* (2009.01)
*H04W 40/02* (2009.01)
*H04W 76/06* (2009.01)

(52) U.S. Cl.
CPC ............ *H04W 76/022* (2013.01); *H04W 40/02* (2013.01); *H04W 76/06* (2013.01); *H04L 2212/0025* (2013.01)
USPC ........... 370/401; 370/331; 370/338; 370/341; 370/392

(58) Field of Classification Search
USPC ......... 370/328, 329, 331, 338, 341, 392, 401; 455/445, 452.1, 452.2
See application file for complete search history.

(56) References Cited

U.S. PATENT DOCUMENTS

| 7,206,856 | B1* | 4/2007 | Murphy et al. ............... 709/238 |
| 7,478,167 | B2* | 1/2009 | Ould-Brahim et al. ....... 709/238 |
| 8,406,198 | B2 | 3/2013 | Chen |
| 2004/0017796 | A1 | 1/2004 | Lemieux et al. |
| 2006/0198345 | A1* | 9/2006 | Chen ............................. 370/338 |
| 2008/0130571 | A1 | 6/2008 | Maeda et al. |
| 2009/0122990 | A1* | 5/2009 | Gundavelli et al. ........... 380/278 |
| 2010/0177702 | A1* | 7/2010 | Nieminen et al. ............ 370/328 |

FOREIGN PATENT DOCUMENTS

| CN | 1774905 A | 5/2006 |
| EP | 1 560 378 | 8/2005 |
| EP | 1 653 675 | 5/2006 |
| EP | 1986392 | 10/2008 |
| WO | 2008018153 | 2/2008 |

OTHER PUBLICATIONS

Finnish Search Report dated Sep. 10, 2009, from corresponding Finnish application.
European Search Report dated Jan. 25, 2010 from EP09174135.
Chinese Office Action, dated Jun. 5, 2013, from corresponding CN application.

* cited by examiner

*Primary Examiner* — Christopher Grey
(74) *Attorney, Agent, or Firm* — Young & Thompson

(57) ABSTRACT

In a data communication system according to the invention the functionality of the gateway device is distributed in a data communication network thereby reducing the need to direct the data traffic from and to terminals (212, 213, 214) through a single point in the data communication network. A first data communication device (207) is arranged to make, through signalling, second data communication devices (204, 205, 206) capable of directing the data communications of the terminals to the starting points of the respective logical data communication tunnels (215, 216, 217). This way there is no need for all logical data communication tunnels to start from, or depending on the direction, to end at, the same point in the data communication network.

40 Claims, 6 Drawing Sheets

METHOD AND DEVICE FOR FORWARDING DATA TRANSPORT FRAMES

FIELD OF INVENTION

The invention relates to a data communication device for forwarding data transport frames. The invention also relates to a data communication device for controlling the forwarding of data transport frames. The invention also relates to a method for forwarding data transport frames. The invention also relates to a method for controlling the forwarding of data transport frames. The invention also relates to a computer program for forwarding data transport frames. The invention also relates to data communication system.

BACKGROUND OF INVENTION

FIG. 1 shows a prior-art data communication system 100 used for connecting to base stations 101, 102, and 103 of a mobile telephone network. The data communication system includes data communication devices 104, 105, 106, and 107, which may by e.g. IP (Internet Protocol) routers, multiprotocol label switches (MPLS) and/or Ethernet switches. Each data communication device may consist of a single apparatus or a combination of a plurality of apparatuses. The data communication devices are interconnected through a regional data communication network 108. The data communication network 108 includes other data communication devices and data communication links between them. The data communication system includes a gateway device 109 providing a connection to a data communication backbone network 110, represented e.g. by the global internet. The gateway device 109 is connected through a data communication device 107 to the regional data communication network 108. The data communication system includes a mobility management entity (MME) 111 which is arranged to maintain up-to-date information about the locations of terminals 112, 113, and 114 in the radio communication network comprised of base stations 101 to 103. The mobility management entity 111 is connected to the gateway device 109 either directly or through the data communication network. The mobility management entity 111 may also be embedded in the gateway device 109. Each of the terminals 112, 113, and 114 could be a mobile phone or a palmtop computer, for example. The mobility management entity 111 is arranged to produce control data based on the locations of terminals 112 to 114 so that data communication devices 104 to 107 and the gateway device 109 are able to form logical data communication tunnels 115, 116, and 117 between the base stations 101, 102, and 103 and the gateway device 109. Such logical data communication tunnels may be e.g. GTP-U (General Packet Radio Service Tunneling Protocol-User plane messages) tunnels, GRE (Generic Routing Encapsulation) tunnels, IpinIP (Internet Protocol in Internet Protocol) tunnels or data communication tunnels implemented using Ethernet frames.

In the situation depicted in FIG. 1 we can assume, for example, that terminal 112 is in the coverage area of base station 101, terminal 113 is in the coverage area of base station 102, and terminal 114 is in the coverage area of base station 103. We can further assume that the data of terminal 112 is transferred in the logical data communication tunnel 115, the data of terminal 113 is transferred in the logical data communication tunnel 116, and the data of terminal 114 is transferred in the logical data communication tunnel 117. If, for example, terminal 112 moves from the coverage area of base station 101 into the coverage area of base station 102, the logical data communication tunnel 115 is removed and a corresponding new logical data communication tunnel is formed between the gateway device 109 and base station 102. The problem with the data communication system 100 described above is that the data traffic from and to the terminals travels through the gateway device 109. In other words, the data traffic from and to the terminals must go through a single point in the data communication network. Therefore, the regional data communication network 108, the data communication device 107, and the gateway device 109 may come under a very heavy load, which has to be taken into consideration when designing data communication links and data communication devices.

SUMMARY OF INVENTION

The invention is directed to a novel data communication system in which the functionality of the gateway device is distributed in a data communication network thereby reducing the need to direct the data traffic from and to terminals through a single point in the data communication network.

A data communication system according to the invention comprises:
  a first data communication device connected to a data communication network, the first data communication device including a transmitter for transmitting data transport frames to the data communication network, and
  second data communication devices connected to the data communication network, each of the second data communication devices including a receiver for receiving data transport frames from the data communication network and a transmitter for transmitting data transport frames to the data communication network.

The first data communication device includes a processor device arranged to write control data in one or more first data transport frames to be transmitted to the data communication network, the control data comprising: (a) instructions to establish and remove logical data communication tunnels defined on the basis of mobility of terminals connected to the data communication network, and (b) information updated on the basis of mobility of the terminals for determining forwarding actions for data transport frames based on forwarding control data contained in the data transport frames in order to transfer the data transport frames through the data communication network to the starting points of the logical data communication tunnels.

Each of the second data communication devices includes a processor device arranged to:
  read the control data from the one or more of the first data transport frames received from the data communication network, and
  determine forwarding actions for a second data transport frame received in a logical data communication tunnel on the basis of the control data and the forwarding control data contained in the second data transport frame.

The data traffic from and to the terminals need not travel through a single point in the data communication network because the first data communication device is arranged to make, through signalling, each of the second data communication devices capable of directing the data traffic of the terminal to the starting point of the respective logical data communication tunnel. This way there is no need for all the logical data communication tunnels to start, or depending on the direction, to end, at a single point in the data communication network like in the prior-art data communication system depicted in FIG. 1, where all the logical data communication tunnels begin or end at one single point in the data communication network, i.e. at the gateway device 109.

The invention is also directed to a novel data communication device for controlling the forwarding of data transport frames, the data communication device comprising:
- a transmitter for transmitting data transport frames to a data communication network,
- a processor device arranged to write control data in one or more first data transport frames to be transmitted to the data communication network, the control data comprising: (a) instructions to establish and remove logical data communication tunnels defined on the basis of mobility of terminals connected to the data communication network, and (b) information updated on the basis of mobility of the terminals for determining forwarding actions for second data transport frames based on forwarding control data contained in the second data transport frames in order to transfer the second data transport frames through the data communication network to the starting points of the logical data communication tunnels.

The invention is also directed to a novel data communication device for forwarding data transport frames, the data communication device comprising:
- a receiver for receiving data transport frames from a data communication network,
- a transmitter for transmitting data transport frames to the data communication network, and
- a processor device arranged to:
  (i) read control data from one or more first data transport frames received from the data communication network, the control data containing (a) instructions to establish and remove logical data communication tunnels defined on the basis of mobility of terminals connected to the data communication network, and (b) information updated on the basis of mobility of the terminals for determining forwarding actions for data transport frames based on forwarding control data contained in the data transport frames in order to transfer the data transport frames through the data communication network to the starting points of the logical data communication tunnels, and
  (ii) determine forwarding actions for a second data transport frame received in a logical data communication tunnel on the basis of the control data and the forwarding control data contained in the second data transport frame.

The invention is also directed to a novel method for controlling the forwarding of data transport frames, in which method:
- control data is written in one or more first data transport frames, the control data containing: (a) instructions to establish and remove logical data communication tunnels defined on the basis of mobility of terminals connected to the data communication network, and (b) information updated on the basis of mobility of the terminals for determining forwarding actions for second data transport frames based on forwarding control data contained in the second data transport frames in order to transfer the second data transport frames through the data communication network to the starting points of the logical data communication tunnels, and
- the one or more first data transport frame(s) is/are sent to the data communication network.

The invention is also directed to a novel method for forwarding data transport frames, in which method:
- one or more first data transport frames are received from a data communication network,
- control data is read from the one or more first data transport frames, the control data containing (a) instructions to establish and remove logical data communication tunnels defined on the basis of mobility of terminals connected to the data communication network, and (b) information updated on the basis of mobility of the terminals for determining forwarding actions for data transport frames based on forwarding control data contained in the data transport frames in order to transfer the data transport frames through the data communication network to the starting points of the logical data communication tunnels,
- forwarding actions are determined for a second data transport frame received in a logical data communication tunnel on the basis of the control data and the forwarding control data contained in the second data transport frame, and
- the second data transport frame is sent to the data communication network in accordance with the forwarding actions determined.

The invention is also directed to a novel computer program for forwarding data transport frames, the computer program comprising software means for controlling a programmable processor device to:
- read control data from one or more first data transport frames received from the data communication network, the control data containing (a) instructions to establish and remove logical data communication tunnels defined on the basis of mobility of terminals connected to the data communication network, and (b) information updated on the basis of mobility of the terminals for determining forwarding actions for data transport frames based on forwarding control data contained in the data transport frames in order to transfer the data transport frames through the data communication network to the starting points of the logical data communication tunnels, and
- determine forwarding actions for a second data transport frame received in a logical data communication tunnel on the basis of the control data and the forwarding control data contained in the second data transport frame.

The various embodiments of the invention are characterised by that which is specified in the dependent claims.

BRIEF DESCRIPTION OF DRAWINGS

Embodiments and advantages of the invention will now be described in closer detail with reference to the embodiments presented as examples and to the accompanying drawings where

FIG. 1 was explained earlier in this document in connection with the description of the prior art.

DESCRIPTION OF EMBODIMENTS OF INVENTION

Figure 2:
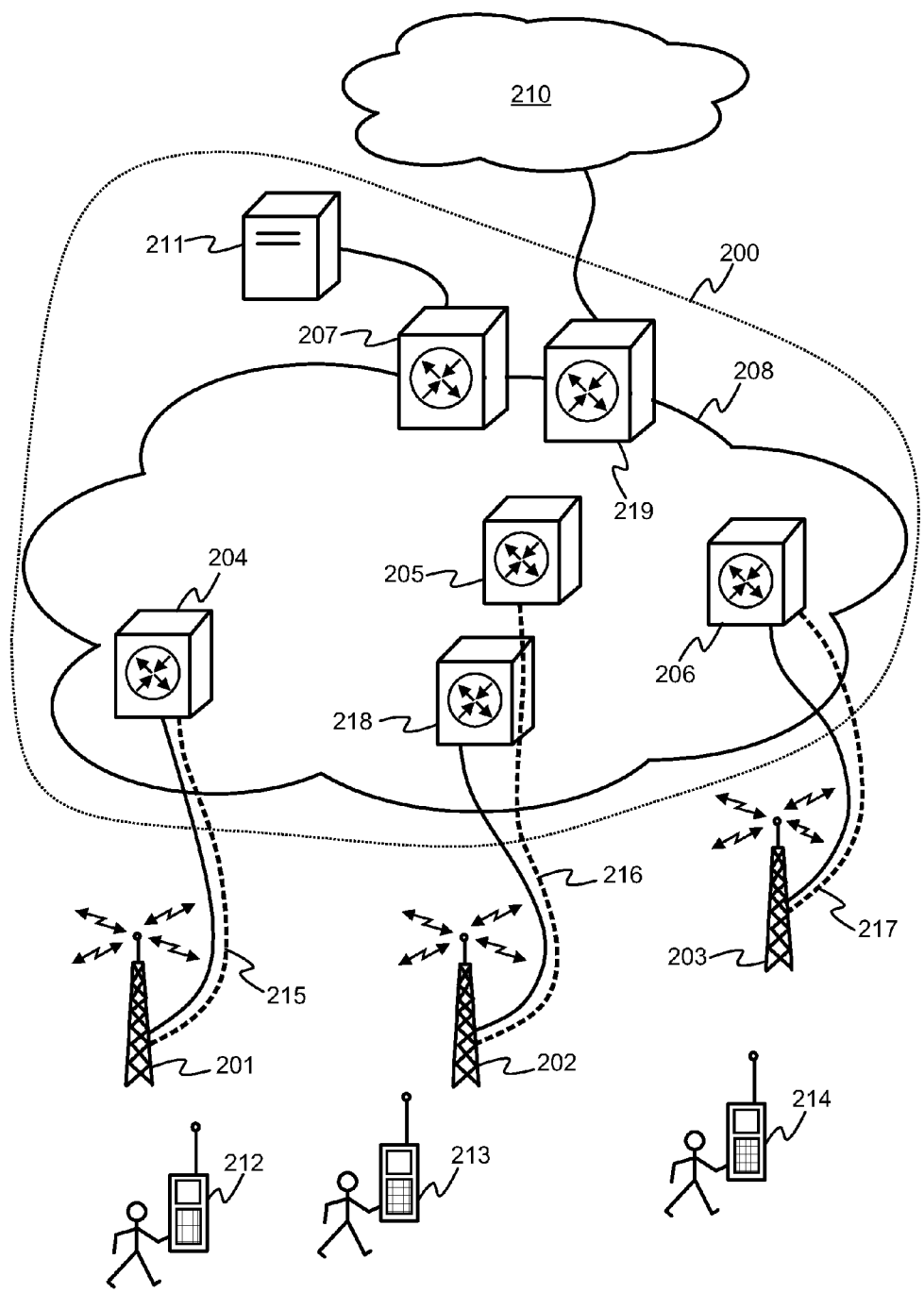
FIG. 2 shows a data communication system according to an embodiment of the invention.

FIG. 2 shows a data communication system 200 according to an embodiment of the invention used for connecting to base stations 201, 202, and 203 of a mobile telephone network. The data communication system comprises a first data communication device 207 and second data communication devices 204, 205, and 206. The data communication devices may be e.g. IP (Internet Protocol) routers, multiprotocol label switches (MPLS), and/or Ethernet switches. Each data communication device may consist of a single apparatus or a combination of a plurality of apparatuses. The data communication devices are interconnected through a regional data communication network 208. The regional data communication network 208 may also include other data communication devices and data communication links between them. The data communication system is connected through a data communication device 219 to a data communication backbone network 210, which can be represented by the global internet, for example. The data communication system includes a mobility management entity (MME) 211 which is arranged to maintain up-to-date information about the locations of terminals 212, 213, and 214 in the radio communication network comprised of base stations 201, 202, and 203. The mobility management entity 211 is connected to the data communication device 207 either directly or through the data communication network 208. It is also possible that the mobility management entity 211 is embedded in the data communication device 207. It is possible that one and the same data communication device, such as data communication device 207, in the data communication system is connected to both the mobility management entity 211 and the data communication backbone network 210. A terminal can be a mobile phone or palmtop computer, for example.

Based on the locations of terminals 212, 213, and 214 the mobility management entity 211 is arranged to produce control data on the basis of which logical data communication tunnels 215, 216, and 217 can be established between the base stations 201, 202, and 203 and the data communication devices 204, 205, and 206. Such logical data communication tunnels may be e.g. GTP-U (General Packet Radio Service Tunneling Protocol-User plane messages) tunnels, GRE (Generic Routing Encapsulation) tunnels, IpinIP (Internet Protocol in Internet Protocol) tunnels or data communication tunnels implemented using Ethernet frames. The logical data communication tunnels advantageously comprise both a downstream tunnel from the data communication device to the terminal and an upstream tunnel from the terminal to the data communication device. The GRE tunnel is described e.g. in the technical specification IETF RFC2784 (Internet Engineering Task Force—Request For Comments), the IpinIP tunnel is described e.g. in the technical specification IETF RFC2003, and the GTP-U tunnel is described e.g. in the technical specification 3GPP TS29.060 (3rd Generation Partnership Project, Technical Spefication). Data communication between the data communication devices 204, 205, 206, 207, and 219 and base stations 201, 202, and 203 may employ e.g. one or more of the following data communication protocols:

IP (Internet Protocol) where the addresses used can be selected from the public IP address space, for instance,
Ethernet,
IP VPN (Internet Protocol, Virtual Private Network), and/or
VPLS (Virtual Private LAN Service, LAN=Local Area Network).

Using the IP VPN and VPLS protocols it is possible to define parallel virtual data communication networks in the data communication network 208. For example, one could use virtual data communication network A for data transport frames from and to terminals of corporate subscribers, and another virtual data communication network B for data transport frames from and to terminals of consumer subscribers. It is also possible to use different virtual data communication networks for the data transport frames from and to terminals of different subscribers based on the rates charged from the subscribers. IP VPN is described e.g. in the technical specification IETF RFC4364, and VPLS is described e.g. in the technical specification IETF RFC4762.

In the data communication between data communication devices 204, 205, 206, 207, and 219 and base stations 201, 202, and 203 it is also possible to use logical data communication tunnels such as GTP-U (General Packet Radio Service Tunneling Protocol-User plane messages) tunnels, GRE (Generic Routing Encapsulation) tunnels, IpinIP (Internet Protocol in Internet Protocol) tunnels or data communication tunnels implemented using Ethernet frames.

The data communication device 207 includes a transmitter for transmitting data transport frames to the data communication network 208, and a processor device arranged to write control data CD in one or more first data transport frames F1 to be transmitted to the data communication network, the control data comprising:

(a) instructions to establish and remove logical data communication tunnels 215, 216, and 217 defined on the basis of mobility of terminals 212, 213, and 214 connected to the data communication network 208, and
(b) information updated on the basis of mobility of the terminals, so that forwarding actions can be determined for data transport frames on the basis of that information using forwarding control data contained in the data transport frames in order to transfer the data transport frames through the data communication network 208 to the starting points of the logical data communication tunnels.

The above-mentioned control data CD is based on information received by the data communication device 207 from the mobility management entity 211.

The information for determining forwarding actions mentioned in (b) above may comprise e.g. an IP or Ethernet forwarding table or updates to one or both of those forwarding tables which can be used for determining forwarding actions based on an IP or Ethernet destination address (DA), for example.

The forwarding control data contained in a data transport frame may comprise an IP destination address or Ethernet destination address, for example. The forwarding control data may also comprise e.g. information indicative of a class of service (CoS) applied to the data transport frame and/or information indicative of a virtual data communication network used for the data transport frame. The forwarding actions may include e.g. transmission of the data transport frame through a particular logical or physical output port.

Each of the data communication devices 204, 205, and 206 comprises a receiver for receiving data transport frames from a data communication network 208 and a transmitter for transmitting data transport frames to the data communication network. Each of the data communication devices 204, 205, and 206 comprises a processor device arranged to:

read the control data CD from the one or more first data transport frames F1 received from the data communication network 208, and
determine forwarding actions for second data transport frames F2 received in a logical data communication tunnel 215, 216, or 217 on the basis of the control data and the forwarding control data contained in the second data transport frames.

The data transport frames F1 and F2 mentioned above may be IP (Internet Protocol) packets or Ethernet frames, for example. The IP packets may be either IPv4 (Internet Protocol version 4) packets or IPv6 (Internet Protocol version 6) packets. In the situation depicted in FIG. 2 we can assume, for example, that terminal 212 is in the coverage area of base station 201, terminal 213 is in the coverage area of base station 202, and terminal 214 is in the coverage area of base station 203. Let us further assume that terminal 212 produces a data transport frame addressed to terminal 213. Data communication device 204 then receives the data transport frame from a logical data communication tunnel 215. After that, the data communication device 204 determines forwarding actions for the data transport frame on the basis of the control data mentioned above and the forwarding control data contained in the data transport frame. The control data may comprise an IP forwarding table, for instance, and the forwarding control data contained in the data transport frame may comprise an IP destination address, for instance. Based on the forwarding actions determined the data communication device sends the data transport frame to the data communication device 205 through the data communication network 208. The data communication device 205 receives the data transport frame and determines on the basis of the control data and the forwarding control data contained in the data transport frame that the data transport frame should be transmitted in the logical data communication tunnel 216. Then the data communication device 205 sends the data transport frame in the logical data communication tunnel 216 to base station 202 to be forwarded to the terminal 213.

Figure 1:
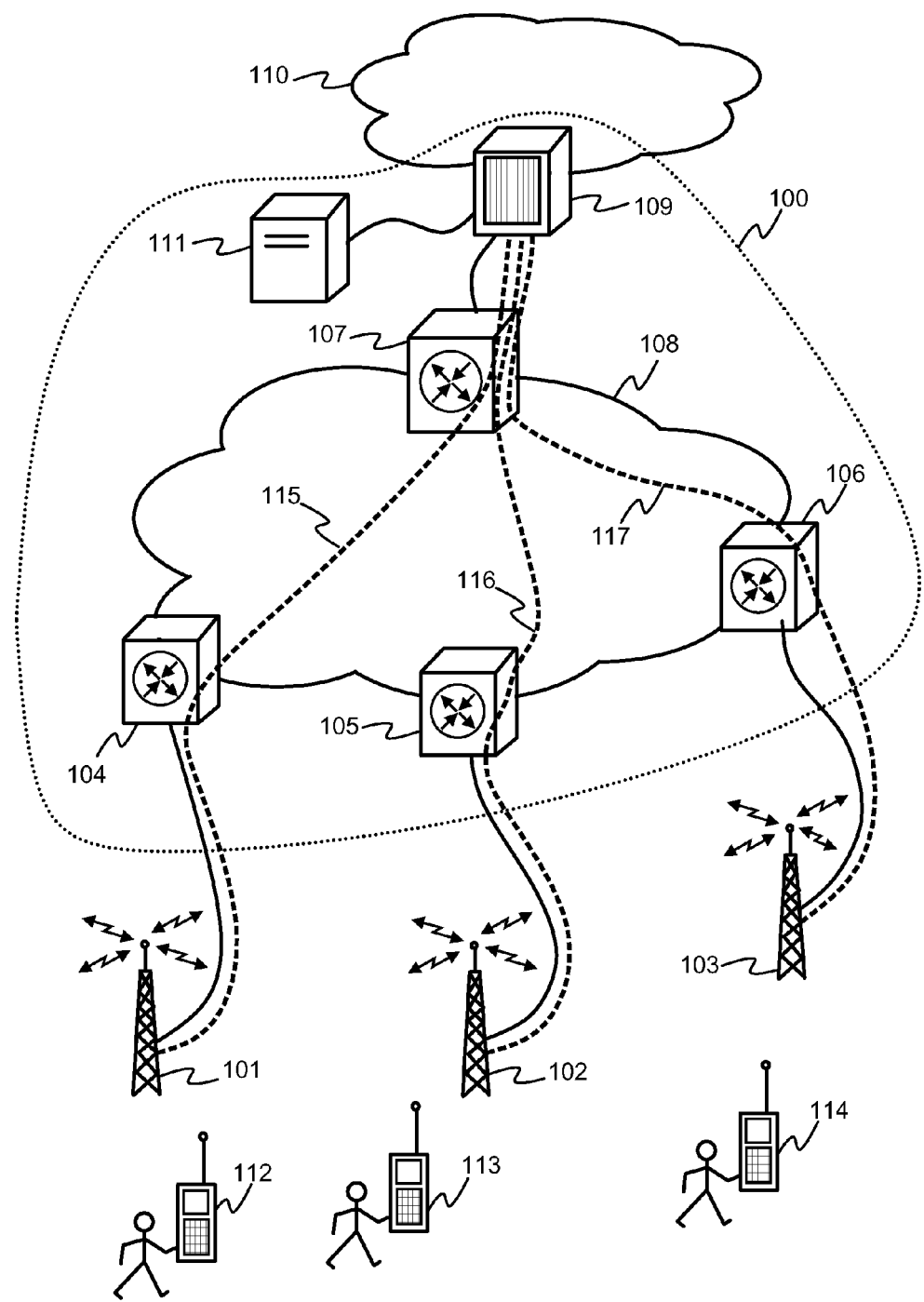
FIG. 1 shows a data communication system according to the prior art.

The data traffic from and to the terminals 212, 213, and 214 need not travel through a single point in the data communication network 208 because the data communication device 207 is arranged to make, through signalling, each of the data communication devices 204, 205, and 206 capable of directing the data traffic of the terminal to the starting point of the respective logical data communication tunnel. This way there is no need for all the logical data communication tunnels to start, or depending on the direction, to end, at a single point in the data communication network like in the prior-art data communication system depicted in FIG. 1, where all the logical data communication tunnels begin or end at one single point in the data communication network, i.e. at the gateway device 109.

In the data communication system depicted in FIG. 2 the data communication devices 204 and 206 are connected through data communication links directly to base stations 201 and 203, and the data communication device 205 is connected to base station 202 via the data communication device 218. The data communication device 218 is advantageously arranged to forward the data transport frames transmitted in the data communication tunnel 216 without termination of the logical data communication tunnel.

Figure 3:
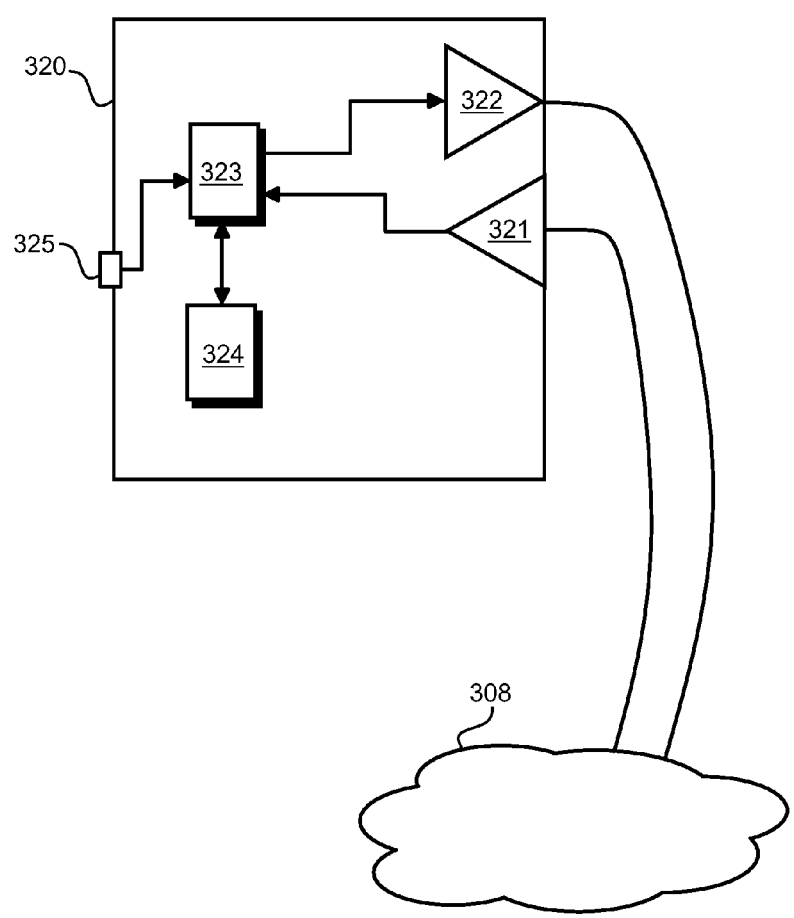
FIG. 3 shows a data communication device according to an embodiment of the invention for controlling the forwarding of data transport frames.

FIG. 3 shows a data communication device 320 according to an embodiment of the invention for controlling the forwarding of data transport frames. The data communication device may be e.g. an IP (Internet Protocol) router, multiprotocol label switch (MPLS), and/or Ethernet switch. The data communication device comprises a transmitter 322 for transmitting data transport frames to a data communication network 308. The data communication device includes a processor device 323 arranged to write control data in one or more first data transport frames to be transmitted to the data communication network, the control data comprising:

(a) instructions to establish and remove logical data communication tunnels determined on the basis of mobility of terminals connected to the data communication network, and (b) information updated on the basis of mobility of the terminals for determining forwarding actions for second data transport frames based on forwarding control data contained in the second data transport frames in order to transfer the second data transport frames through the data communication network to the starting points of the logical data communication tunnels.

The data communication device may also comprise a storage means 323 and/or an interface 325 for connecting to an external storage means. The processor device 323 may consist of one or more processors each of which may be e.g. a programmable processor, application specific integrated circuit (ASIC), field programmable gate array (FPGA) or a combination of any of the above.

Such logical data communication tunnels may be e.g. GTP-U (General Packet Radio Service Tunneling Protocol-User plane messages) tunnels, GRE (Generic Routing Encapsulation) tunnels, IPinIP (Internet Protocol in Internet Protocol) tunnels or data communication tunnels implemented using Ethernet frames.

The first and second data transport frames may be IPv4 (Internet Protocol) packets, IPv6 packets or Ethernet frames, for example. The forwarding control data contained in the data transport frame may comprise an IP (Internet Protocol) destination address or Ethernet destination address, for example.

A data communication device 320 according to an embodiment of the invention includes a receiver 321 for receiving data transport frames from the data communication network. A processor device 323 is arranged to read from the data transport frames instructions for establishing and removing logical data communication tunnels. The data transport frames may contain information sent by the mobility management entity (211, FIG. 2).

A data communication device 320 according to an embodiment of the invention comprises an interface 325 through which the data communication device can be connected to a mobility management entity.

Figure 4:
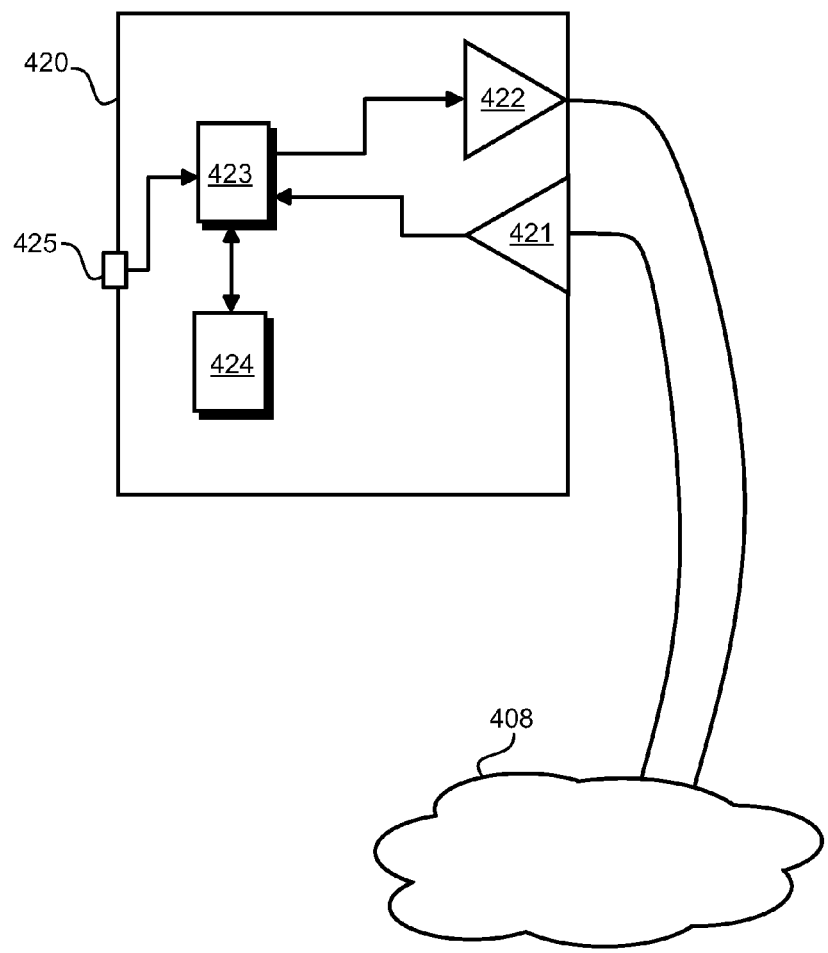
FIG. 4 shows a data communication device according to an embodiment of the invention for forwarding data transport frames.

FIG. 4 shows a data communication device according to an embodiment of the invention for forwarding data transport frames. The data communication device may be e.g. an IP (Internet Protocol) router, multiprotocol label switch (MPLS), and/or Ethernet switch. The data communication device comprises a receiver 421 for receiving data transport frames from a data communication network 408 and a transmitter 422 for transmitting data transport frames to the data communication network. The data communication device comprises a processor device 423 arranged to:

read control data from one or more first data transport frames received from the data communication network, the control data containing (a) instructions to establish and remove logical data communication tunnels defined on the basis of mobility of terminals connected to the data communication network, and (b) information updated on the basis of mobility of the terminals for determining forwarding actions for data transport frames based on forwarding control data contained in the data transport frames in order to transfer the data transport frames through the data communication network to the starting points of the logical data communication tunnels, and determine forwarding actions for a second data transport frame received in a logical data communication tunnel on the basis of the control data and the forwarding control data contained in the second data transport frame.

The data communication device may also comprise a storage means 424 and/or an interface 425 for connecting to an external storage means. The processor device 423 may consist of one or more processors each of which may be e.g. a programmable processor, application specific integrated circuit (ASIC), field programmable gate array (FPGA) or a combination of any of the above.

In a data communication device according to an embodiment of the invention the processor device 423 is arranged to support GTP-U data communication tunnels and the data communication tunnels are GTP-U data communication tunnels (General Packet Radio Service Tunneling Protocol-User plane messages).

In a data communication device according to an embodiment of the invention the processor device 423 is arranged to support GRE data communication tunnels and the data communication tunnels are GRE data communication tunnels (Generic Routing Encapsulation).

In a data communication device according to an embodiment of the invention the processor device 423 is arranged to support data communication tunnels implemented with Ethernet frames and the data communication tunnels are implemented with Ethernet frames.

In a data communication device according to an embodiment of the invention the processor device 423 is arranged to support IPinIP data communication tunnels and the data communication tunnels are IPinIP data communication tunnels (Internet Protocol in Internet Protocol).

The first data transport frames and the second data transport frame may be IPv4 (Internet Protocol) packets, IPv6 packets or Ethernet frames, for example.

In a data communication device according to an embodiment of the invention the processor device 423 is arranged to use an IP destination address at least as part of the forwarding control data and the forwarding control data includes an IP (Internet Protocol) destination address.

In a data communication device according to an embodiment of the invention the processor device 423 is arranged to use an Ethernet destination address at least as part of the forwarding control data and the forwarding control data includes an Ethernet destination address.

In a data communication device according to an embodiment of the invention the processor device 423 is arranged to select one of the virtual data communication networks predefined for the data communication network on the basis of a logical data communication tunnel associated with the second data transport frame. Such predefined virtual data communication networks may be IP VPNs (Internet Protocol, Virtual Private Network) or VPLS (Virtual Private LAN Service) virtual data communication networks, for example.

Figure 5:
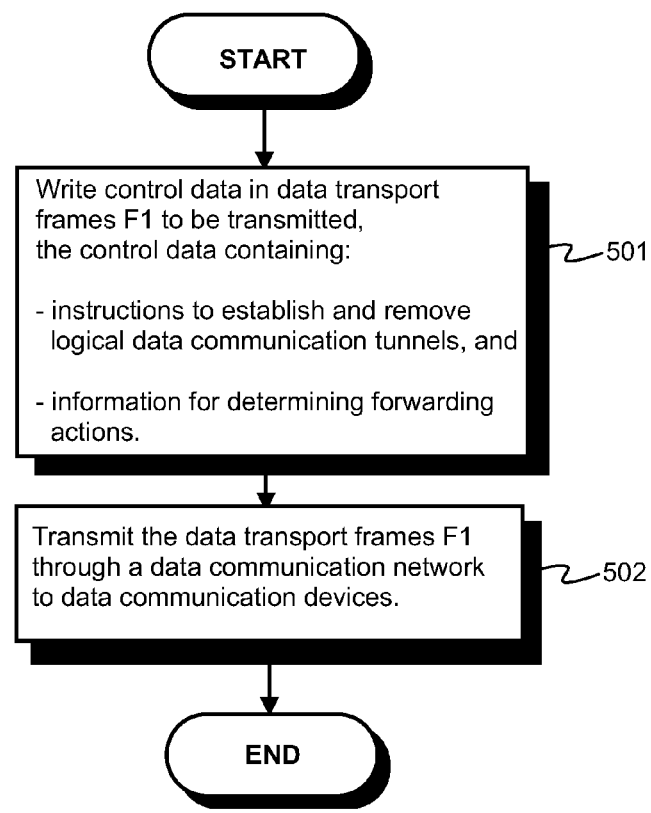
FIG. 5 shows in a flow diagram a method according to an embodiment of the invention for controlling the forwarding of data transport frames.

FIG. 5 shows in a flow diagram a method according to an embodiment of the invention for controlling the forwarding of data transport frames. In step 501 control data is written in one or more first data transport frames F1, the control data containing:

(a) instructions to establish and remove logical data communication tunnels defined on the basis of mobility of terminals connected to the data communication network, and (b) information updated on the basis of mobility of the terminals for determining forwarding actions for second data transport frames based on forwarding control data contained in the second data transport frames in order to transfer the second data transport frames through the data communication network to the starting points of the logical data communication tunnels.

In step 502 the one or more first data transport frames F1 is/are sent through a data communication network to data communication devices.

The method shown in FIG. 5 can be implemented e.g. in a data communication device 207 of the data communication system depicted in FIG. 2. In that case the control data is advantageously transmitted to data communication devices 204, 205, and 206. It is also possible that each data communication device 204, 205, and 206 is only sent that part of the control data which concerns it.

Figure 6:
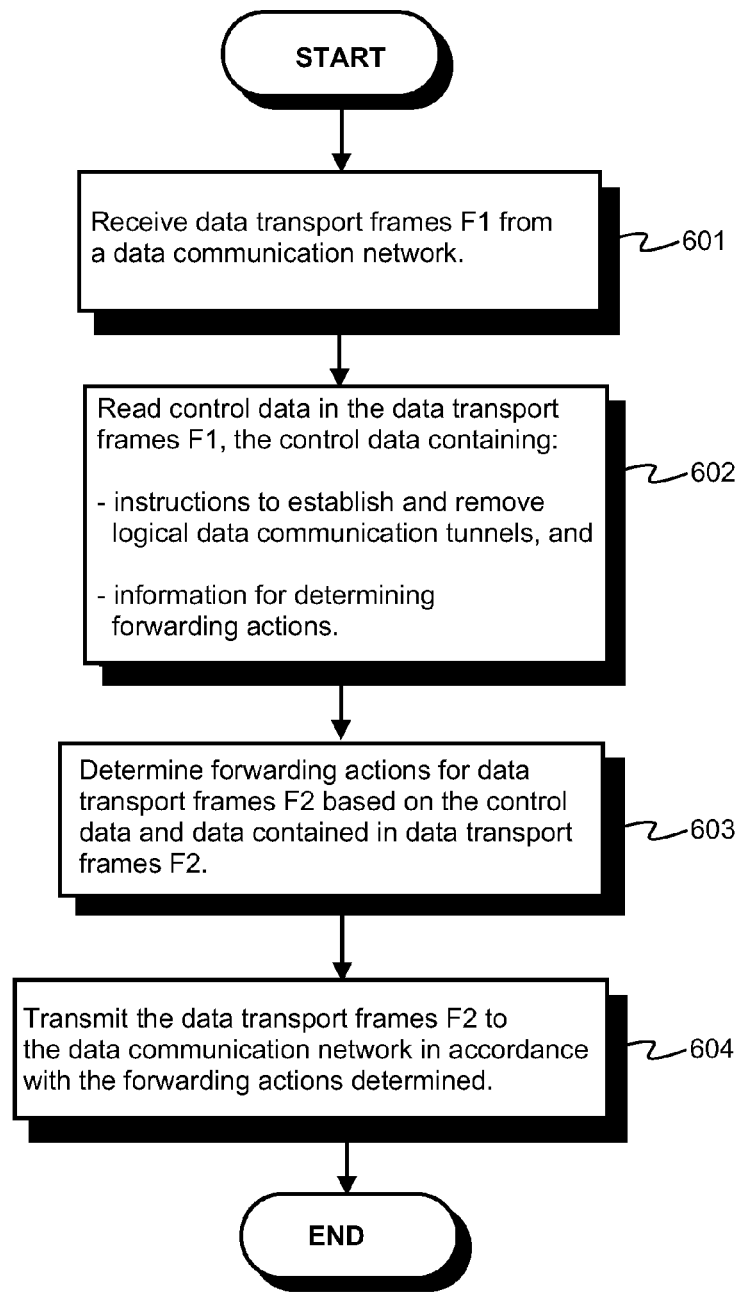
FIG. 6 shows in a flow diagram a method according to an embodiment of the invention for forwarding data transport frames.

FIG. 6 shows in a flow diagram a method according to an embodiment of the invention for forwarding data transport frames. In step 601 one or more first data transport frames F1 are received from a data communication network. In step 602 control data is read from the one or more first data transport frames F1, which control data comprises (a) instructions to establish and remove logical data communication tunnels defined on the basis of mobility of terminals connected to the data communication network, and (b) information updated on the basis of mobility of the terminals for determining forwarding actions for data transport frames based on forwarding control data contained in the data transport frames in order to transfer these data transport frames through the data communication network to the starting points of the logical data communication tunnels.

In step 603 forwarding actions are determined for a second data transport frame F2 received in a logical data communication tunnel on the basis of the control data and the forwarding control data contained in the second data transport frame. In step 604 the second data transport frame is sent to the data communication network in accordance with the forwarding actions determined.

In a method according to an embodiment of the invention the data communication tunnels are GTP-U data communication tunnels (General Packet Radio Service Tunneling Protocol-User plane messages).

In a method according to an embodiment of the invention the data communication tunnels are GRE (Generic Routing Encapsulation) data communication tunnels.

In a method according to an embodiment of the invention the data communication tunnels are implemented using Ethernet frames.

In a method according to an embodiment of the invention the data communication tunnels are IPinIP (Internet Protocol in Internet Protocol) data communication tunnels.

In a method according to an embodiment of the invention the first data transport frames F1 and the second data transport frame F2 are IP (Internet Protocol) packets.

In a method according to an embodiment of the invention the first data transport frames F1 and the second data transport frame F2 are Ethernet frames.

In a method according to an embodiment of the invention the forwarding control data comprises an IP (Internet Protocol) destination address.

In a method according to an embodiment of the invention the forwarding control data comprises an Ethernet destination address.

In a method according to an embodiment of the invention one of the virtual data communication networks predefined for the data communication network is selected on the basis of a logical data communication tunnel associated with the second data transport frame F2.

In a method according to an embodiment of the invention the predefined virtual data communication networks are IP VPNs (Internet Protocol, Virtual Private Network).

In a method according to an embodiment of the invention the predefined virtual data communication networks are VPLS (Virtual Private LAN Service) data communication networks.

The method shown in FIG. 6 can be implemented e.g. in a data communication device 204, data communication device 205, and/or data communication device 206 of the data communication system depicted in FIG. 2.

A computer program according to an embodiment of the invention for forwarding data transport frames comprises instructions executable by a programmable processor device for controlling the programmable processor device to:

read control data from one or more first data transport frames received from a data communication network, the control data containing (a) instructions to establish and remove logical data communication tunnels defined on the basis of mobility of terminals connected to the data communication network, and (b) information updated on the basis of mobility of the terminals for determining forwarding actions for data transport frames based on forwarding control data contained in the data transport frames in order to transfer the data transport frames through the data communication network to the starting points of the logical data communication tunnels, and determine forwarding actions for a second data transport frame received in a logical data communication tunnel on the basis of the control data and the forwarding control data contained in the second data transport frame.

A computer program according to an embodiment of the invention further comprises instructions executable by a programmable processor device for controlling the programmable processor device to write the control data into one or more third data transport frames to be transmitted to the data communication network.

A computer program according to an embodiment of the invention is stored on a storage medium, such as an optical compact disk (CD) readable by a programmable processor.

A computer program according to an embodiment of the invention is coded into a signal which can be received via a data communication network such as the internet, for example.

As is obvious to a person skilled in the art, the invention and its embodiments are not limited to the illustrative embodiments described above. Expressions used in the claims describing the existence of characteristic features, such as e.g. "the data communication device comprises a processor device", are non-exclusive such that a mention of a characteristic feature shall not exclude the existence of other characteristic features not mentioned in the independent claims.

What is claimed is:

1. A data communication device for forwarding data transport frames, the data communication device comprising:
a receiver for receiving data transport frames from a data communication network,
a transmitter for transmitting data transport frames to the data communication network, and
a processor device arranged to:
(i) read control data from one or more first data transport frames received from the data communication network, the control data containing (a) instructions to establish and remove logical data communication tunnels defined on the basis of mobility of terminals connected to the data communication network and, after being established, comprising a first logical data communication tunnel ending at the data communication device and one or more second logical data communication tunnels starting at one or more other data communication devices, and (b) information updated on the basis of mobility of the terminals for determining forwarding actions for data transport frames based on forwarding control data contained in the data transport frames in order to transfer the data transport frames through the data communication network to the one or more other network elements providing starting points of the one or more second logical data communication tunnels, and
(ii) determine forwarding actions for a second data transport frame received from the first logical data communication tunnel on the basis of the control data and the forwarding control data contained in the second data transport frame.

2. A data communication device according to claim 1, wherein the processor device is arranged to support GTP-U (General Packet Radio Service Tunneling Protocol—User plane messages) data communication tunnels and the data communication tunnels are GTP-U data communication tunnels.

3. A data communication device according to claim 1, wherein the processor device is arranged to support GRE (Generic Routing Encapsulation) data communication tunnels and the data communication tunnels are GRE data communication tunnels.

4. A data communication device according to claim 1, wherein the processor device is arranged to support data communication tunnels implemented with Ethernet frames and the data communication tunnels are implemented with Ethernet frames.

5. A data communication device according to claim 1, wherein the processor device is arranged to support IPinIP (Internet Protocol in Internet Protocol) data communication tunnels and the data communication tunnels are IPinIP data communication tunnels.

6. A data communication device according claim 1, wherein in that the first data transport frames and the second data transport frame are IP (Internet Protocol) packets.

7. A data communication device according to claim 1, wherein in that the first data transport frames and the second data transport frame are Ethernet frames.

8. A data communication device according to claim 6, wherein the processor device is arranged to use an IP destination address at least as part of the forwarding control data and the forwarding control data includes an IP (Internet Protocol) destination address.

9. A data communication device according to claim 7, wherein the processor device is arranged to use an Ethernet destination address at least as part of the forwarding control data and the forwarding control data includes an Ethernet destination address.

10. A data communication device according to claim 1, wherein the processor device is arranged to select one of virtual data communication networks predefined for the data communication network on the basis of the first logical data communication tunnel associated with the second data transport frame.

11. A data communication device according to claim 10, wherein the predefined virtual data communication networks are IP VPNs (Internet Protocol, Virtual Private Network).

12. A data communication device according to claim 10, wherein the predefined virtual data communication networks are VPLS (Virtual Private Local Area Network Service) networks.

13. A data communication device according to claim 1, wherein the data communication device is at least one of the following: IP (Internet Protocol) router, multiprotocol label switch (MPLS), Ethernet switch.

14. A data communication device for controlling forwarding of data transport frames, the data communication device comprising a transmitter for transmitting data transport frames to a data communication network, and a processor device arranged to write control data in one or more first data transport frames to be transmitted to the data communication network, the control data comprising:
  (a) instructions to establish and remove logical data communication tunnels determined on the basis of mobility of terminals connected to the data communication network and, after being established, comprising a first logical data communication tunnel ending at a first other data communication device and one or more second logical data communication tunnels starting at one or more second other data communication devices, and
  (b) information updated on the basis of mobility of the terminals for determining forwarding actions for second data transport frames based on forwarding control data contained in the second data transport frames in order to transfer the second data transport frames through the data communication network, from the first other data communication device to the one or more second other data communication devices providing starting points of the one or more second logical data communication tunnels.

15. A data communication device according to claim 14, wherein the data communication tunnels are GTP-U (General Packet Radio Service Tunneling Protocol—User plane messages) data communication tunnels.

16. A data communication device according to claim 14, wherein the data communication tunnels are GRE (Generic Routing Encapsulation) data communication tunnels.

17. A data communication device according to claim 14, wherein the data communication tunnels are data communication tunnels implemented with Ethernet frames.

18. A data communication device according to claim 14, wherein the data communication tunnels are IPinIP (Internet Protocol in Internet Protocol) data communication tunnels.

19. A data communication device according to claim 14, wherein the first and second data transport frames are IP (Internet Protocol) packets.

20. A data communication device according to claim 14, wherein the first and second data transport frames are Ethernet frames.

21. A data communication device according to claim 14, wherein the data communication device comprises a receiver for receiving third data transport frames from the data communication network and the processor device is arranged to read from the third data transport frames instructions for establishing and removing logical data communication tunnels.

22. A data communication device according to claim 19, wherein the forwarding control data comprises an IP (Internet Protocol) destination address.

23. A data communication device according to claim 20, wherein the forwarding control data comprises an Ethernet destination address.

24. A data communication device according to claim 14, wherein the data communication device is at least one of the following: IP (Internet Protocol) router, multiprotocol label switch (MPLS), Ethernet switch.

25. A method for forwarding data transport frames, the method comprising:
  at a first data communication device, receiving from a data communication network one or more first data transport frames,
  at the first data communication device, reading control data from the one or more first data transport frames, the control data containing (a) instructions to establish and remove logical data communication tunnels defined on the basis of mobility of terminals connected to the data communication network and, after being established, comprising a first logical data communication tunnel ending at the first data communication device and one or more second logical data communication tunnels starting at one or more second data communication devices, and (b) information updated on the basis of mobility of the terminals for determining forwarding actions for data transport frames based on forwarding control data contained in the data transport frames in order to transfer the data transport frames through the data communication network, from the first data communication device to the one or more second data communication devices providing starting points of the one or more second logical data communication tunnels,
  at the first data communication device, determining forwarding actions for a second data transport frame received from the first logical data communication tunnel on the basis of the control data and the forwarding control data contained in the second data transport frame, and
  at the first data communication device, transmitting the second data transport frame to the data communication network in accordance with the forwarding actions determined.

26. A method according to claim 25, wherein the data communication tunnels are GTP-U (General Packet Radio Service Tunneling Protocol—User plane messages) data communication tunnels.

27. A method according to claim 25, wherein the data communication tunnels are GRE (Generic Routing Encapsulation) data communication tunnels.

28. A method according to claim 25, wherein the data communication tunnels are data communication tunnels implemented with Ethernet frames.

29. A method according to claim 25, wherein the data communication tunnels are IPinIP (Internet Protocol in Internet Protocol) data communication tunnels.

30. A method according to claim 25, wherein the first data transport frames and the second data transport frame are IP (Internet Protocol) packets.

31. A method according to claim 25, wherein the first data transport frames and the second data transport frame are Ethernet frames.

32. A method according to claim 30, wherein the forwarding control data comprises an IP (Internet Protocol) destination address.

33. A method according to claim 31, wherein the forwarding control data comprises an Ethernet destination address.

34. A method according to claim 25, wherein one of virtual data communication networks predefined for the data communication network is selected on the basis of the first logical data communication tunnel associated with the second data transport frame.

35. A method according to claim 34, wherein the predefined virtual data communication networks are IP VPNs (Internet Protocol, Virtual Private Network).

36. A method according to claim 34, wherein the predefined virtual data communication networks are VPLS (Virtual Private LAN Service) networks.

37. A method for controlling the forwarding of data transport frames, the method comprising:

writing control data into one or more first data transport frames, the control data containing: (a) instructions to establish and remove logical data communication tunnels determined on the basis of mobility of terminals connected to a data communication network and, after being established, comprising a first logical data communication tunnel ending at a first data communication device and one or more second logical data communication tunnels starting at one or more second data communication devices, and (b) information updated on the basis of mobility of the terminals for determining forwarding actions for second data transport frames based on forwarding control data contained in the second data transport frames in order to transfer the second data transport frames through the data communication network, from the first data communication device to the one or more second other data communication devices providing starting points of the one or more second logical data communication tunnels, and transmitting to the data communication network the one or more first data transport frames.

38. A non-transitory computer readable medium storing a computer program for forwarding data transport frames, the computer program comprising instructions executable by a programmable processor device for controlling the programmable processor device to:

read control data from one or more first data transport frames received from a data communication network, the control data containing (a) instructions to establish and remove logical data communication tunnels defined on the basis of mobility of terminals connected to the data communication network and, after being established, comprising a first logical data communication tunnel ending at the first data communication device and one or more second logical data communication tunnels starting at one or more second data communication devices, and (b) information updated on the basis of mobility of the terminals for determining forwarding actions for data transport frames based on forwarding control data contained in the data transport frames in order to transfer the data transport frames, through the data communication network, from the first data communication device to the one or more second other data communication devices providing starting points of the one or more second logical data communication tunnels, and determine forwarding actions for a second data transport frame received from the first logical data communication tunnel on the basis of the control data and the forwarding control data contained in the second data transport frame.

39. A non-transitory computer readable medium according to claim 38, wherein the computer program comprises instructions executable by a programmable processor device for controlling the programmable processor device to write the control data into one or more third data transport frames to be transmitted to the data communication network.

40. A data communication system comprising:

a first data communication device connected to a data communication network, the first data communication device comprising a transmitter for transmitting data transport frames to the data communication network, and second data communication devices connected to the data communication network, each of the second data communication devices comprising a receiver for receiving data transport frames from the data communication network and a transmitter for transmitting data transport frames to the data communication network, wherein the first data communication device comprises a processor device arranged to write control data in one or more first data transport frames to be transmitted to the data communication network, the control data containing:

(a) instructions to establish and remove logical data communication tunnels defined on the basis of mobility of terminals connected to the data communication network and, after being established, comprising a first logical data communication tunnel ending at one of the second data communication devices and one or more second logical data communication tunnels starting at one or more of the other second data communication devices, and (b) information updated on the basis of mobility of the terminals for determining forwarding actions for data transport frames based on forwarding control data contained in the data transport frames in order to transfer these data transport frames, through the data communication network from the second data communication device providing an ending point of the first logical data communication tunnel to the second data communication devices providing starting points of the logical data communication tunnels, and wherein the second data communication device providing the ending point of the first logical data communication tunnel comprises a processor device arranged to:

read the control data from the one or more of the first data transport frames received from the data communication network, and determine forwarding actions for a second data transport frame received from the first logical data communication tunnel on the basis of the control data and the forwarding control data contained in the second data transport frame.

* * * * *